(12) United States Patent
Noma

(10) Patent No.: US 7,459,221 B2
(45) Date of Patent: Dec. 2, 2008

(54) MAGNETIC FILM COMPOSED OF A FIRST ALLOY FILM INCLUDING IRON AND PLATINUM OR IRON AND PALLADIUM

(75) Inventor: Kenji Noma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 509 days.

(21) Appl. No.: 10/997,389

(22) Filed: Nov. 23, 2004

(65) Prior Publication Data
US 2006/0008679 A1    Jan. 12, 2006

(30) Foreign Application Priority Data
Jul. 8, 2004    (JP) .............................. 2004-201355

(51) Int. Cl.
*G11B 5/127*    (2006.01)
(52) U.S. Cl. ..................... 428/812; 428/815.2; 360/110
(58) Field of Classification Search .................. None
See application file for complete search history.

(56) References Cited

U.S. PATENT DOCUMENTS 5,234,775 A * 8/1993 Dirne et al. ................. 428/635
6,132,892 A * 10/2000 Yoshikawa et al. .......... 428/812
6,842,317 B2 * 1/2005 Sugita et al. ............. 360/324.2
6,855,240 B2 * 2/2005 Cooper et al. ................ 205/103
2005/0264957 A1 * 12/2005 Li et al. .................. 360/324.12
2005/0271901 A1 * 12/2005 Noma et al. ................. 428/812
2006/0078762 A1 * 4/2006 Noma et al. ................. 428/812

FOREIGN PATENT DOCUMENTS

JP    07-045432    2/1995

OTHER PUBLICATIONS

Machine Translation of JP 07-045432 A.*

* cited by examiner

*Primary Examiner*—Kevin M Bernatz
(74) *Attorney, Agent, or Firm*—Greer, Burns & Crain, Ltd.

(57) ABSTRACT

In the magnetic film, projection of a magnetic pole, which is caused when a magnetic head is heated, can be restrained. The magnetic film can be applied to a magnetic head of a hard disk drive unit capable of recording data with high recording density. The magnetic film comprises: a first alloy film made of an alloy of iron (Fe) and platinum (Pt), or an alloy of iron (Fe), platinum (Pt) and other metal or metals; and a second alloy film directly layered on the first alloy film, the second alloy film made of an alloy of at least two metals selected from a group including iron (Fe), nickel (Ni) and cobalt (Co). Molar content of iron (Fe) in the first alloy film is 63-74%.

11 Claims, 5 Drawing Sheets

FIG.1A

| PROTECTION FILM (LAYER) | 50nm |
|---|---|
| Ni₈₁ Fe₁₉ | 1400nm |
| Fe₇₂ Pt₂₈ | 100nm |
| Fe₇₀ Co₃₀ | 250nm |
| BASE LAYER | 5nm |

FIG.1B

| PROTECTION FILM (LAYER) | 50nm |
|---|---|
| Ni₈₁ Fe₁₉ | 1400nm |
| Fe₇₀ Co₃₀ | 250nm |
| Fe₇₂ Pt₂₈ | 100nm |
| BASE LAYER | 5nm |

FIG.1C

| PROTECTION FILM (LAYER) | 50nm |
|---|---|
| Ni₈₁ Fe₁₉ | 1400nm |
| Fe₇₀ Co₃₀ | 250nm |
| Ru | 1nm |
| Fe₇₂ Pt₂₈ | 100nm |
| BASE LAYER | 5nm |

FIG.1D

| PROTECTION FILM (LAYER) | 50nm |
|---|---|
| Ni₈₁ Fe₁₉ | 1400nm |
| Fe₇₂ Pt₂₈ | 100nm |
| Ru | 1nm |
| Fe₇₀ Co₃₀ | 250nm |
| BASE LAYER | 5nm |

FIG.2A
PRIOR ART

| PROTECTION FILM (LAYER) | 50nm |
|---|---|
| Ni₈₁ Fe₁₉ | 1400nm |
| Fe₇₀ Co₃₀ | 250nm |
| BASE LAYER | 5nm |

FIG.2B
PRIOR ART

| PROTECTION FILM (LAYER) | 50nm |
|---|---|
| Ni₈₁ Fe₁₉ | 1400nm |
| Co₃₃ Ni₁₀ Fe₅₇ | 400nm |
| Fe₇₀ Co₃₀ | 150nm |
| BASE LAYER | 5nm |

MAGNETIC FILM COMPOSED OF A FIRST ALLOY FILM INCLUDING IRON AND PLATINUM OR IRON AND PALLADIUM

BACKGROUND OF THE INVENTION

The present invention relates to a magnetic film, which can be applied to a magnetic head, etc., a magnetic head and a solid device, which include the magnetic film.

Recording density of hard disk drive units is increasing 100% every year. To maintain the increasing rate from now on, resolution of a recording head in a direction of gap length must be improved, further width of an element of the head in a direction of track width must be smaller. In conventional recording heads, it is important to make a clearance between the recording head and a recording medium smaller so as to improve the resolution of the recording head, further it is also important to make the width of the element of the head smaller.

Figure 10:
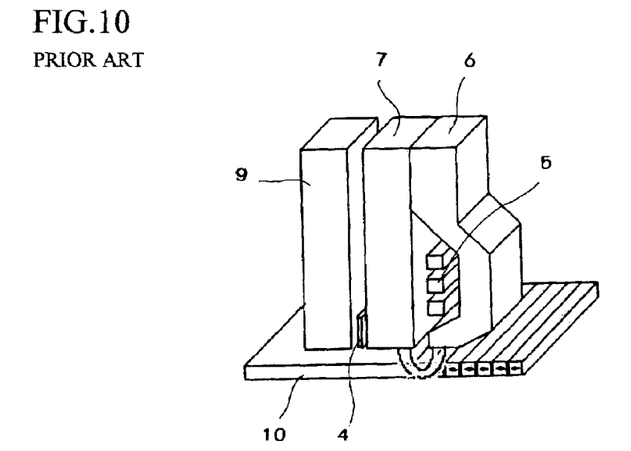
FIG. 10 is an explanation view of the magnetic head for longitudinal magnetic recording.
Figure 11:
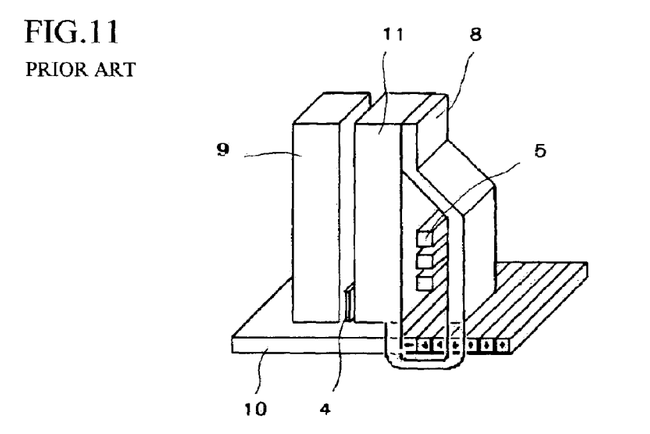
FIG. 11 is an explanation view of the magnetic head for perpendicular magnetic recording.

Conventional recording heads of hard disk drive units are shown in FIGS. 10 and 11. FIG. 10 shows a conventional head for longitudinal magnetic recording; FIG. 22 shows a conventional head for perpendicular magnetic recording. In each of the conventional recording heads, an electric current runs through a coil 5, which is made of a metallic film having small resistance, e.g., copper film, so that a magnetic field is induced in the coil 5 by Ampere's law. The induced magnetic field is converged in a magnetic pole, which is made of a magnetic film having high magnetic permeability, and a high density magnetic field is generated so that magnetic patterns can be recorded in a recording medium 10.

In the recording head for longitudinal magnetic recording, an upper magnetic pole 6 and a lower magnetic pole 7 constitute a closed magnetic circuit with a recording gap; in the recording head for perpendicular magnetic recording, only a main magnetic pole 8 constitutes an opened magnetic circuit.

In the recording head shown in FIG. 10, a reproducing head 4, which faces on the recording medium 10, is located at a position between the lower magnetic pole 7 and a lower shield 9. On the other hand, in recording head shown in FIG. 11, a reproducing head 4, which faces on the recording medium 10, is located at a position between a return yoke 11 and a lower shield 9. With these structures, the magnetic heads are capable of recording data in and reproducing data from the recording media 10.

To record magnetic patterns in the recording medium 10, the magnetic pole or poles are moved closed to the recording medium 10, which is made of a magnetic material having a great coercive force, then an electric current having an optional wave form runs through the coil 5 so as to irradiate the magnetic field toward the recording medium 10. At that time, the recording medium 10 is rotated so as to record magnetic patterns in the recording medium 10 according to polarities of the current running through the coil 5.

In this recording method, a size of the head must be smaller than the magnetic patterns so as to increase recording density. When the magnetic patterns are made smaller, the magnetic pole or poles of the head sometimes project.

Figure 12:
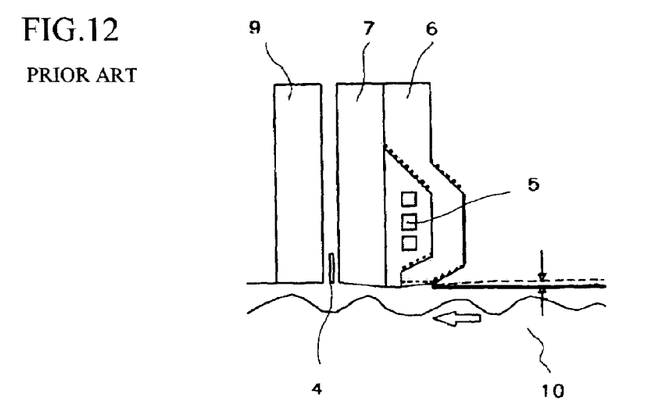
FIG. 12 is an explanation view of the projected magnetic pole.

These days, with increasing the recording density, intensity of a recording magnetic field of a hard disk drive unit is several hundred kA/m. To increase the intensity of the recording magnetic field, it is effective to increase intensity of the current running through the coil 5, but Joule heat also increased. Further, eddy currents are generated when the induced magnetic field passes the magnetic pole, so that the head is further heated. The heat generated in the head expands the upper magnetic pole 6 or the main magnetic pole 8, and alumina around the magnetic pole, so that the magnetic pole projects. In FIG. 12, the magnetic pole projects toward the recording medium 10 by the heat of the recording head.

If the magnetic pole of the recording head projects toward the recording medium 10, the recording magnetic field is deformed, and magnetic patterns cannot be correctly recorded in the recording medium 10. Further, in the worst case, the head contacts the recording medium 10 so that the both are damaged. To prevent the interference between the both, a clearance is formed between the recording head and the recording medium 10 with considering the projection of the magnetic pole. However, a reproducing head 4, which is provided in a plane including the recording head, is separated away from the recording medium 10, so that resolution of the reproducing head 4 must be lowered.

Therefore, even if narrow magnetization patterns are recorded on the recording medium, the reproducing resolution is insufficient, so total recording density of the hard disk drive unit cannot be increased.

These days, a projecting length of a magnetic pole, which is projected by heat of the recording head, is about 5 nm. On the other hand, a clearance between the magnetic pole and the recording medium has been very small, e.g., 10-15 nm. It is necessary for increasing the recording density to make the clearance smaller. Therefore, limiting the projection of the magnetic pole is the most important subject.

On the other hand, it is necessary for a material of the magnetic pole to generate a magnetic field of several hundred kA/m, so a material having great saturation magnetization (Bs) or good soft magnetic characteristics as the material of the magnetic pole. For example, a $Fe_{70}CO_{30}$ alloy, an alloy including $Fe_{70}CO_{30}$ and other metal(s), a chemical compound of the $Fe_{70}CO_{30}$ alloy, a CoNiFe alloy, a $Fe_{50}CO_{50}$ alloy, an alloy including $Fe_{50}CO_{50}$ and other metal(s), and a $Ni_{81}Fe_{19}$ alloy, which are arranged in order of the value of the saturation magnetization (Bs). However, these materials have a positive coefficient of thermal expansion, so that the magnetic pole is projected. Coefficients of linear thermal expansion of the materials are shown in TABLE 1.

TABLE 1

| MATERIAL | COEFFICIENT OF LINEAR THERAMAL EXPANSION $[\times 10^{-6} K^{-1}]$ | SATURATION MAGNETIZATION [T] |
| --- | --- | --- |
| $Fe_{70}Co_{30}$ | 28.2 | 2.4 |
| $Ni_{50}Fe_{50}$ | 10.0 | 1.6 |
| $Ni_{81}Fe_{19}$ | 12.4 | 1.0 |
| Cu | 16.4 | 0 |
| Alumina | 6.8-12.2 | 0 |
| $Fe_{64}Co_{36}$ | 3.5 | 0.8 |
| $Fe_{66}Pd_{34}$ | 1.6 | 0.8 |
| $Fe_{73}Pt_{27}$ | −30 | 1.0 |

The coefficient of linear thermal expansion indicates a ratio of expansion in one direction when temperature of the material rises 1° C. For example, the coefficient of linear thermal expansion of $Fe_{70}CO_{30}$ is $28.2 \times 10^{-6} \cdot K^{-1}$. Namely, if temperature of the $Fe_{70}CO_{30}$ alloy, whose size is 10 mm×10 mm, rises +1° C. one degree, the alloy expands to the size of 10.0141 mm×10.0141 mm. These days, a length of a magnetic poles of a recording head is about μm. When an electric current running through a coil generates heat and temperature of an element rises +50° C., the magnetic pole made of the $Fe_{70}CO_{30}$ alloy totally extends 14.1 nm. Namely, the magnetic pole extends 7 nm toward the recording medium. According to this example, the magnetic pole projects about 5 nm as described above. Therefore, the length of projecting the magnetic pole can be limited by employing a material having a small coefficient of linear thermal expansion.

An inver alloy has been known as a material having a small coefficient of linear thermal expansion. For example, a $Fe_{64}CO_{36}$ alloy, a $Fe_{66}CO_{34}$ alloy and a $Fe_{73}CO_{27}$ alloy are well known as the inver alloys. By employing the inver alloy as a magnetic pole of the recording head, the projection length of the magnetic pole can be reduce to one-tenth of the projection length of the conventional magnetic pole made of the $Fe_{70}CO_{30}$ alloy. However, saturation magnetization of the inver alloys are very small, e.g., 1.0 T, and their soft magnetic characteristics are insufficient, so they have not been used for magnetic poles.

SUMMARY OF THE INVENTION

An object of the present invention is to provide a magnetic film, which is capable of restraining projection of a magnetic pole caused by heat of a magnetic head and generating a strong magnetic field for recording data.

Another object is to provide a magnetic head and a solid device including the magnetic film of the present invention.

To achieve the objects, the present invention has following structures.

The magnetic film of the present invention comprises: a first alloy film being made of an alloy of iron (Fe) and platinum (Pt), or an alloy of iron (Fe), platinum (Pt) and other metal or metals; and a second alloy film being directly layered on the first alloy film, the second alloy film being made of an alloy of at least two metals selected from a group including iron (Fe), nickel (Ni) and cobalt (Co), wherein molar content of iron (Fe) in the first alloy film is 63-74%. By employing the second alloy film having great saturation magnetization and the first alloy film having a small coefficient of linear thermal expansion, the magnetic film can have desired saturation magnetization and can restrain thermal expansion. For example, if the magnetic film is used for a magnetic head of a hard disk drive unit, projection of a magnetic pole can be restrained, and recording density of the hard disk drive unit can be increased.

Another magnetic film comprises: a first alloy film being made of an alloy of iron (Fe) and platinum (Pt), or an alloy of iron (Fe), platinum (Pt) and other metal or metals; a nonmagnetic thin film being layered on the first alloy film; and a second alloy film being layered on the nonmagnetic thin film, the second alloy film being made of an alloy of at least two metals selected from a group including iron (Fe), nickel (Ni) and cobalt (Co), wherein molar content of iron (Fe) in the first alloy film is 63-74%. Since the nonmagnetic thin film is provided between the first and the second alloy films, crystallinity and magnetic characteristics can be improved.

Further, the magnetic film comprises: a first alloy film being made of an alloy of iron (Fe) and palladium (Pd), or an alloy of iron (Fe), palladium (Pd) and other metal or metals; and a second alloy film being directly layered on the first alloy film, the second alloy film being made of an alloy of at least two metals selected from a group including iron (Fe), nickel (Ni) and cobalt (Co), wherein molar content of iron (Fe) in the first alloy film is 62-70%. And, the magnetic film comprises: a first alloy film being made of an alloy of iron (Fe) and palladium (Pd), or an alloy of iron (Fe), palladium (Pd) and other metal or metals; a nonmagnetic thin film being layered on the first alloy film; and a second alloy film being layered on the nonmagnetic thin film, the second alloy film being made of an alloy of at least two metals selected from a group including iron (Fe), nickel (Ni) and cobalt (Co), wherein molar content of iron (Fe) in the first alloy film is 62-70%.

In the magnetic film, the nonmagnetic film may be made of a metallic material selected from a group including tantalum (Ta), nickel-chromium (NiCr) alloy, nickel-iron-chromium (NiFeCr) alloy, chromium (Cr), ruthenium (Ru), iridium (Ir), rhodium (Rh), rhenium (Re), alumina ($Al_2O_3$), nickel-phosphorus (NiP) alloy and titanium (Ti). Further, saturation magnetization of the second alloy film may be 2.0 T or more.

Further, the magnetic film of the present invention comprises an alloy film made of an alloy of at least iron (Fe), cobalt (Co) and platinum (Pt), wherein molar content of platinum (Pt) is 2% or more, and molar content of iron (Fe) is 69-70%.

The magnetic film of the present invention may be used for a magnetic head of a hard disk drive unit and a solid device.

The magnetic film of the present invention has enough saturation magnetization for a magnetic pole of a magnetic head of a hard disk drive unit, and thermal expansion can be limited. Therefore, the magnetic film can be applied to a magnetic head for high density data recording and a thermally stable solid device.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

In the following embodiments, each magnetic film has a first alloy film, which is mainly made of Fe and Pt whose ratio of molar contents (CFe/CPt) is 1.6-2.8, and a second alloy film, which is layered on the first alloy film and which is made of a $Fe_{70}CO_{30}$ alloy having great saturation magnetization. Structures and functions of the magnetic films of the embodiments will be explained.

Figure 2A:
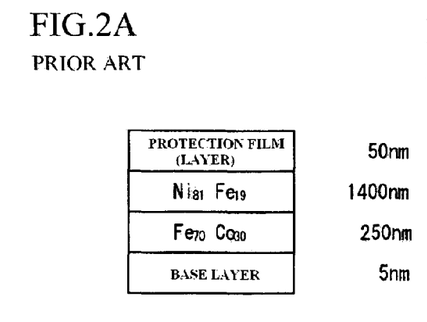
FIGS. 2A and 2B are explanation views of the conventional magnetic films.
Figure 2B:
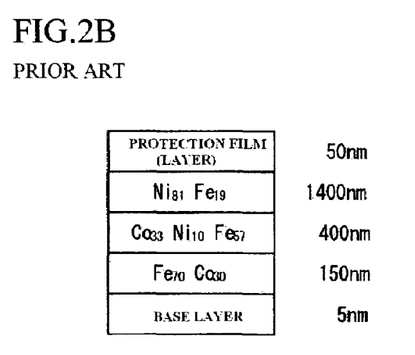

Conventional magnetic films for magnetic poles of recording heads are shown in FIGS. 2A and 2B. FIG. 2A shows a well known layered film including a $Fe_{70}CO_{30}$ film and a $Ni_{81}Fe_{19}$ film; FIG. 2B shows a layered film having a structure of $Fe_{70}CO_{30}/CO_{33}Ni_{10}Fe_{57}/Ni_{81}Fe/_{19}$. Saturation magnetization (Bs) of the $Fe_{70}CO_{30}$ alloy is the greatest among magnetic materials, so it is used for increasing intensity of a writing magnetic field. The $Ni_{81}Fe_{19}$ alloy has corrosion resistance and supplements soft magnetic characteristics of the $Fe_{70}CO_{30}$ alloy. As shown in TABLE 1, the coefficients of thermal expansion of the materials are about $10-5\times 10^{-6}$.

The inventors of the present invention made a $Fe_{70}CO_{30}$ film and FePt films and measured their coefficients of linear thermal expansion under the following conditions. Namely, the $Fe_{70}CO_{30}$ film having thickness of 1 µm was formed on a substrate by spattering. The substrate was a silicon plate which was coated with a spattered alumina film having thickness of 100 nm. Firstly, a diffraction pattern of an fcc crystal of the $Fe_{70}CO_{30}$ film was measured by an X-ray diffractometer (XRD) at temperature of 20° C. Then, a lattice constant ($d_{20c}$) of the crystal of the $Fe_{70}CO_{30}$ film was obtained according to the result. Further, a diffraction pattern was measured by the XRD at temperature of 40° C. And, a lattice constant at 40° C. ($d_{40c}$) was obtained. The coefficient of linear thermal expansion was obtained by a following formula:

$$\Delta 1/1 = (d_{40c} - d_{20c})/d_{20c}$$

Figure 3:
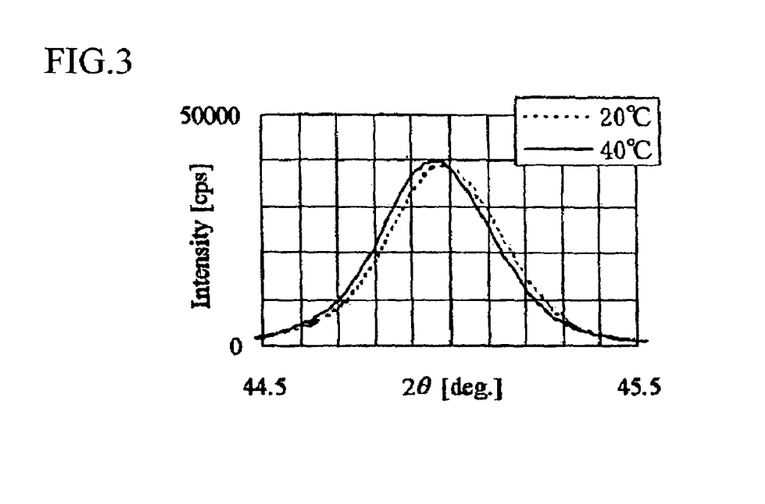
FIG. 3 is a graph showing an X-ray diffraction pattern of a $Fe_{70}CO_{30}$ film.
Figure 4:
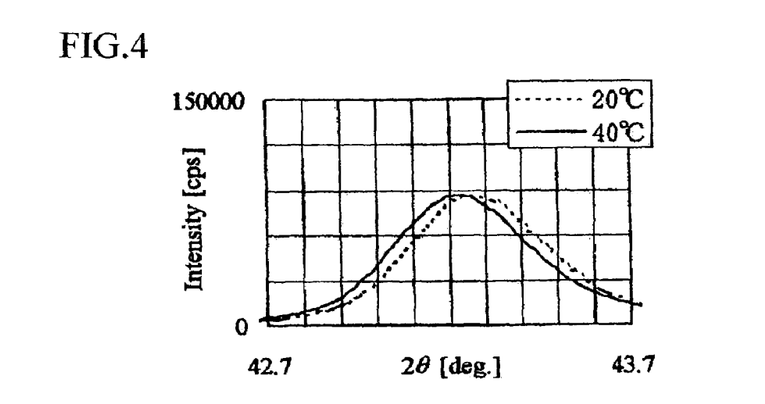
FIG. 4 is a graph showing an X-ray diffraction pattern of a $Fe_{79}CO_{21}$ film.
Figure 5:
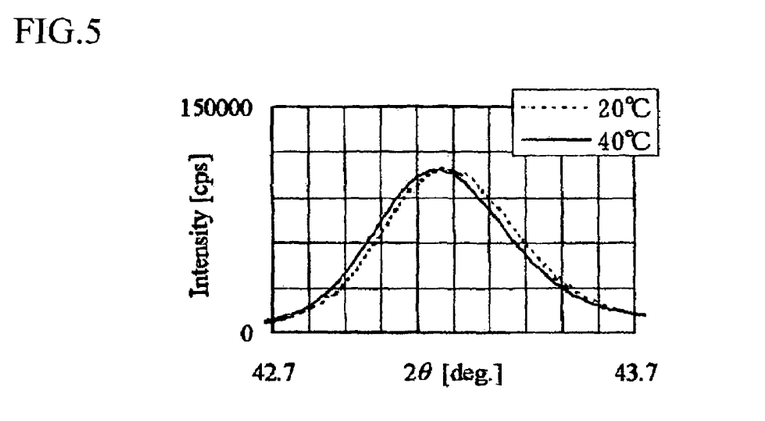
FIG. 5 is a graph showing an X-ray diffraction pattern of a $Fe_{77}CO_{23}$ film.
Figure 6:
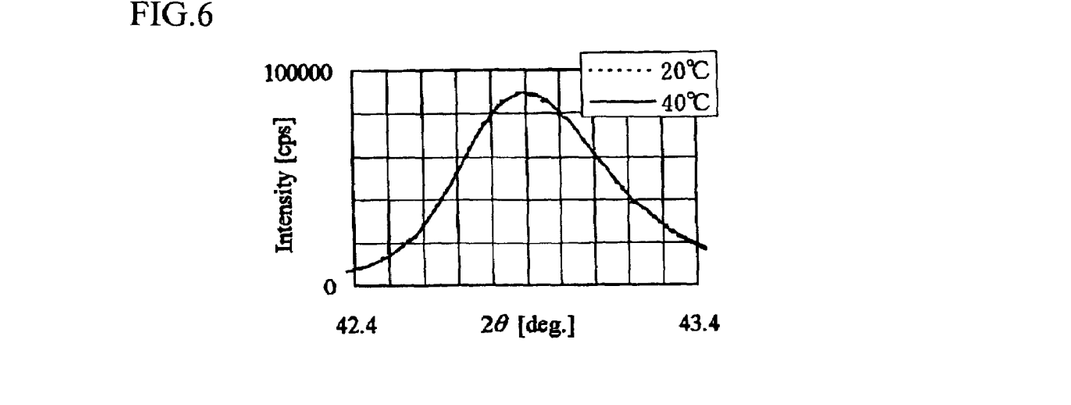
FIG. 6 is a graph showing an X-ray diffraction pattern of a $Fe_{74}CO_{26}$ film.
Figure 7:
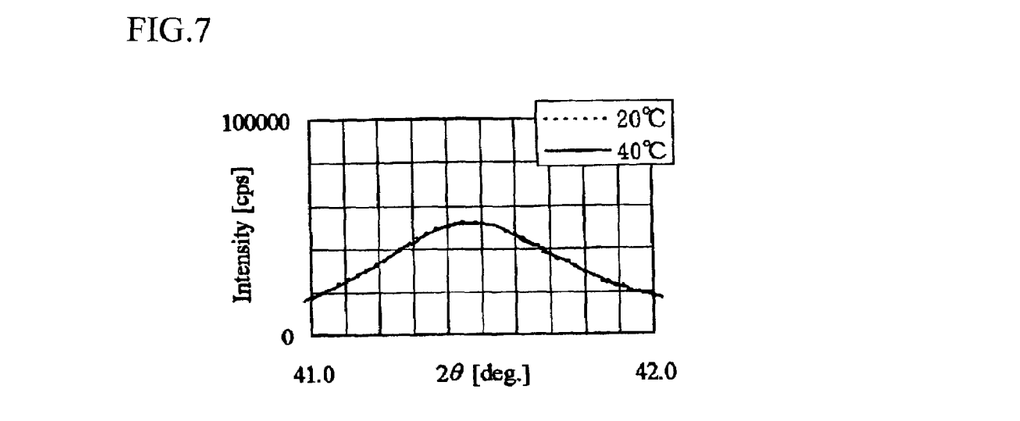
FIG. 7 is a graph showing an X-ray diffraction pattern of a $Fe_{68}CO_{32}$ film.
Figure 8:
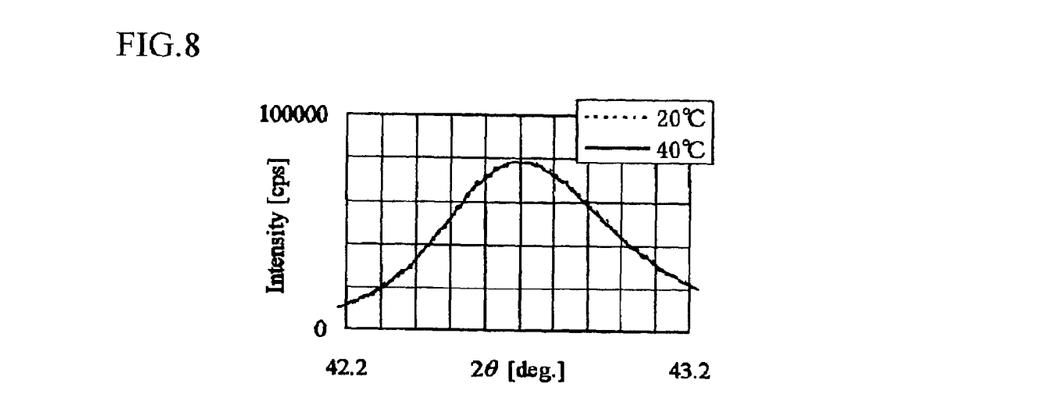
FIG. 8 is a graph showing an X-ray diffraction pattern of a $Fe_{63}CO_{37}$ film.

FIGS. 3-8 shows X-ray diffraction patterns and the coefficients of linear thermal expansion of the $Fe_{70}CO_{30}$ film and the FePt films having different compositions. FIG. 3 shows those of the $Fe_{70}CO_{30}$ film ($\Delta 1/1=23.6\times 10^{-6}$); FIG. 4 shows those of the $Fe_{79}Pt_{21}$ film ($\Delta 1/1=47.4\times 10^{-6}$); FIG. 5 shows those of the $Fe_{77}Pt_{23}$ film ($\Delta 1/1=24.2\times 10^{-6}$); FIG. 6 shows those of the $Fe_{74}Pt_{26}$ film ($\Delta 1/1=-3.4\times 10^{-6}$); FIG. 7 shows those of the $Fe_{68}Pt_{32}$ film ($\Delta 1/1=1.5\times 10^{-6}$); and FIG. 8 shows those of the $Fe_{63}Pt_{37}$ film ($\Delta 1/1=-1.5\times 10^{-6}$).

By comparing the results with the data of TABLE 1, the coefficient of linear thermal expansion of the $Fe_{70}CO_{30}$ film ($23.6\times 10^{-6}$) was approximate to the datum of TABLE 1. On the other hand, in the FePt films, the coefficients of linear thermal expansion was $\Delta 1/1=24.2-47.4\gtrsim\times 10^{-6}$ when an amount of Fe was 77 at % or more; the coefficients of linear thermal expansion was $\Delta 1/1\approx 0$ when the amount of Fe was 63-74 at %.

FIGS. 1A-1D show the magnetic films including the FePt films. In each of the magnetic films, molar content of Fe is 63-74%, and the FePt film, whose coefficient of linear thermal expansion is $\Delta 1/1\approx 0$, is combined with the $Fe_{70}CO_{30}$ film. In each of FIGS. 1A-1D, a $Fe_{72}Pt_{28}$ film is employed as an example of the FePt film, whose coefficient of linear thermal expansion is $\Delta 1/1\approx 0$.

Figure 1A:
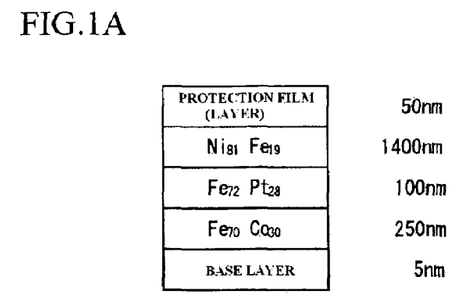
FIGS. 1A-1D are explanation views of embodiments of the magnetic films of the present invention.
Figure 1B:
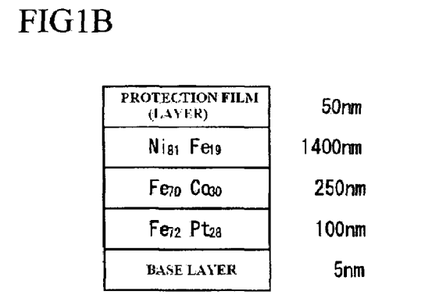

In FIG. 1A, the $Fe_{72}Pt_{28}$ film is formed on the $Fe_{70}CO_{30}$ film; in FIG. 1B, the $Fe_{70}CO_{30}$ film is formed on the $Fe_{72}Pt_{28}$ film.

Figure 1C:
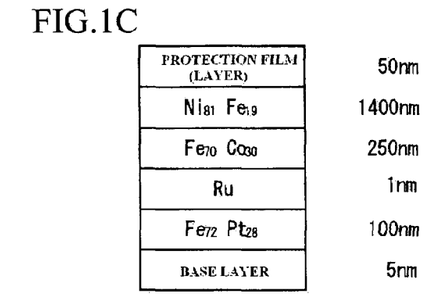
Figure 1D:
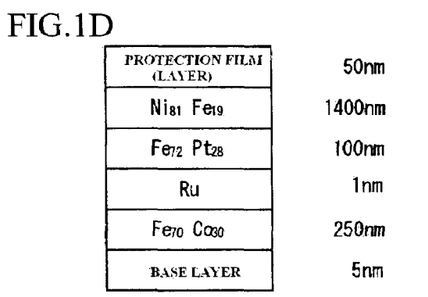

Further, as shown in FIGS. 1C and 1D, a nonmagnetic seed layer may be formed between the $Fe_{72}Pt_{28}$ film and the $Fe_{70}CO_{30}$ film. Further, in FIGS. 1C and 1D, Ru films are provided as nonmagnetic seed layers. The thickness of the nonmagnetic seed layer is designed to maintain ferromagnetic coupling between the $Fe_{72}Pt_{28}$ film and the $Fe_{70}CO_{30}$ film. The nonmagnetic seed layer is capable of improving crystallinity and magnetic characteristics of a film formed thereon.

In FIGS. 1A and 1D, the $Fe_{72}Pt_{28}$ film is directly or indirectly formed on the $Fe_{70}CO_{30}$; in FIGS. 1B and 1C, the $Fe_{70}CO_{30}$ film is directly or indirectly formed on the $Fe_{72}Pt_{28}$. A magnetic head for longitudinal recording has a lower magnetic pole and an upper magnetic pole. The lower magnetic pole, which has the layered structure of $Fe_{72}Pt_{28}/Fe_{70}CO_{30}$ is capable of generating a strong magnetic field; the upper magnetic pole, which has the layered structure of $Fe_{70}CO_{30}/Fe_{72}Pt_{28}$ is capable of generating a strong magnetic field. Therefore, the both layered structures are used in the magnetic poles.

The coefficient of linear thermal expansion ($\Delta 1/1$) and magnetic characteristics of the magnetic films are shown in TABLE 2.

TABLE 2

| FILM STRUCTURE | $\Delta 1/1$ | COERCIVE FORCE [Oe] |
|---|---|---|
| Ru 5 nm/$Fe_{70}CO_{30}$ 250 nm/$Ni_{81}Fe_{19}$ 1,400 nm/Ta 50 nm | $14.8\times 10^{-6}$ | 21.9 |
| Ru 5 nm/$Fe_{70}CO_{30}$ 250 nm/$Fe_{72}Pt_{28}$ 100 nm/$Ni_{81}Fe_{19}$ 1,400 nm/Ta 50 nm | $-8.4\times 10^{-6}$ | 20.3 |
| Ru 5 nm/$Fe_{72}Pt_{28}$ 100 nm/$Fe_{70}Co_{30}$ 250 nm/$Ni_{81}Fe_{19}$ 1,400 nm/Ta 50 nm | $7.5\times 10^{-6}$ | 54.5 |
| Ru 5 nm/$Fe_{72}Pt_{28}$ 100 nm/Ru 5 nm/$Fe_{70}Co_{30}$ 250 nm/$Ni_{81}Fe_{19}$ 1,400 nm/Ta 50 nm | $3.7\times 10^{-6}$ | 37.2 |

According to TABLE 2, the coefficient of linear thermal expansion of the conventional magnetic film "Ru 5 nm/$Fe_{70}CO_{30}$ 250 nm/$Ni_{81}Fe_{19}$ 1,400 nm/Ta 50 nm" is $\Delta 1/1=14.8\times 10^{-6}$; the coefficient of the magnetic film "Ru 5 nm/$Fe_{70}CO_{30}$ 250 nm/$Fe_{72}Pt_{28}$ 100 nm/$Ni_{81}Fe_{19}$ 1,400 nm/Ta 50 nm" (FIG. 1A) is $\Delta 1/1=-8.4\times 10^{-6}$; the coefficient of the magnetic film "Ru 5 nm/$Fe_{72}Pt_{28}$ 100 mm/$Fe_{70}CO_{30}$ 250 nm/$Ni_{81}Fe_{19}$ 1,400 nm/Ta 50 nm" (FIG. 1B) is $\Delta 1/1=7.5\times 10^{-6}$; and the coefficient of the magnetic film "Ru 5 mm/$Fe_{72}Pt_{28}$ 100 nm/Ru 5 nm/$Fe_{70}CO_{30}$ 250 nm/$Ni_{81}Fe_{19}$ 1,400 nm/Ta 50 nm" (FIG. 1C) is $\Delta 1/1=3.7\times 10^{-6}$. Namely, the coefficients of linear thermal expansion ($\Delta 1/1$) of the embodiments shown in FIGS. 1A-1C are improved with respect to that of the conventional magnetic film.

Note that, a coercive force Hc of the magnetic film shown in FIG. 1A is 20.3 Oe. On the other hand, a coercive force Hc of the magnetic film shown in FIG. 1B is 54.5 Oe. Namely, a soft magnetic characteristic of the magnetic film shown in FIG. 1B is worse than that of the magnetic film shown in FIG. 1A. To improve the soft magnetic characteristic of the $Fe_{70}CO_{30}$ layer, the magnetic film shown in FIG. 1C has the Ru seed layer, so that a coercive force Hc of the magnetic film "Ru 5 nm/$Fe_{72}Pt_{28}$ 100 nm/Ru 5 nm/$Fe_{70}CO_{30}$ 250 nm/$Ni_{81}Fe_{19}$ 1,400 nm/Ta 50 nm" is 37.2 Oe, which is smaller than that of the film shown in FIG. 1B. Therefore, the seed layer improves the soft magnetic characteristic of the magnetic film. The effect of improving the soft magnetic characteristic can be obtained by using nonmagnetic materials, e.g., Ta, NiCr alloy, Cr, Ru, If, Rh, alumina, NiP alloy, Ti.

By using the magnetic film of each embodiment for a magnetic pole of a magnetic head of a hard disk drive unit, projecting the magnetic pole toward a recording medium, which is caused by heat generated in the magnetic head, can be restrained, so that resolution of reproducing signals of the magnetic head can be improved and the recording density of the hard disk drive unit can be increased. Since the magnetic films of the embodiments have great saturation magnetization, they can be used as suitable materials for magnetic poles of magnetic heads of hard disk drive units.

In the above described embodiments, the FePt film is used as the first alloy film, further a FePd film may be used as the first alloy film instead of the FePt film. The FePd film is capable of restraining the projection of the magnetic pole or poles of the magnetic head as well as the FePt film. When molar content of Fe in the FePd film is 62-70%, the coefficient of linear thermal expansion can be nearly zero. Namely, by combining the FePt film with a film having great saturation magnetization, e.g., $Fe_{70}CO_{30}$ film, the projection of the magnetic pole or poles of the magnetic head can be restrained and the recording density of the hard disk drive unit can be increased.

The inventors found that the coefficient of linear thermal expansion of a ternary alloy including Fe, Co and Pt was small and the saturation magnetization thereof was relatively great within a specific composition range. In the case of the above described FePt film, the FeCo film is required; in the ternary FeCoPt film, the thermal expansion can be restrained and enough saturation magnetization can be obtained without forming the FeCo film.

Saturation magnetization and coefficients of linear thermal expansion ($\Delta l/l$) of FeCoPt films having different compositions are shown in TABLE 3.

TABLE 3

| COMPOSITION OF FeCoPt FILM | SATURATION MAGNETIZATION [T] | $\Delta l/l$ |
|---|---|---|
| $Fe_{70}Co_{30}$ | 2.40 | $23.6 \times 10^{-6}$ |
| $Fe_{69}Co_{29}Pt_2$ | 2.41 | $10.3 \times 10^{-6}$ |
| $Fe_{66}Co_{27}Pt_7$ | 2.39 | $19.7 \times 10^{-6}$ |
| $Fe_{63}Co_{26}Pt_{11}$ | 2.34 | $23.8 \times 10^{-6}$ |
| $Fe_{79}Co_{18}Pt_3$ | 2.21 | $24.2 \times 10^{-6}$ |
| $Fe_{73}Co_{17}Pt_{10}$ | 2.22 | $21.0 \times 10^{-6}$ |
| $Fe_{70}Co_{17}Pt_{13}$ | 2.31 | $14.0 \times 10^{-6}$ |
| $Fe_{68}Co_{16}Pt_{16}$ | 2.31 | $19.0 \times 10^{-6}$ |
| $Fe_{89}Co_{10}Pt_1$ | 2.33 | $24.5 \times 10^{-6}$ |
| $Fe_{87}Co_{10}Pt_3$ | 2.30 | $23.2 \times 10^{-6}$ |
| $Fe_{87}Co_{10}Pt_3$ | 2.30 | $23.2 \times 10^{-6}$ |

The coefficients of linear thermal expansion of the FeCoPt films were measured as well as those of the FePt films shown in FIGS. 4-8. The coefficient $\Delta l/l$ mainly depends on content of Fe in the FeCoPt film. If molar content of Fe is 69-70%, the coefficient $\Delta l/l$ can be reduced. Unlike the FePt film having small saturation magnetization, the saturation magnetization of the FeCoPt magnetic films are great, i.e., 2.3-2.4 T. Therefore, the FeCoPt magnetic film can be solely used as the material of magnetic poles.

Figure 9:
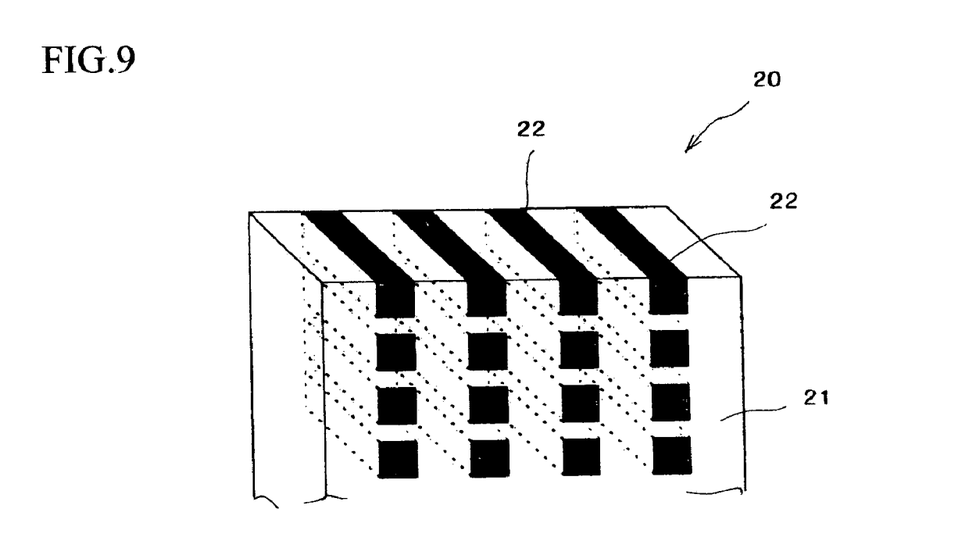
FIG. 9 is an explanation view of a solid device including the magnetic film of the present invention.

A solid device having the magnetic film of the present invention is shown in FIG. 9. The solid device 20 includes: a body section 21 made of palladium; and fine cables 22, in each of which the FePt film and the $Fe_{70}CO_{30}$ film are layered and which are arranged at regular intervals. The body section 21 and the fine cables 22 are formed by alternately spattering or evaporating with a mask.

Since the fine cables 22 have great saturation magnetization, the solid device 20 can be used as a device for magnetic data recording. The coefficients of linear thermal expansion of the fine cables 22 are small, so the solid device 20 can be used as a thermally stable recording device.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A single magnetic pole of a magnetic head comprising a magnetic film, the magnetic film comprising:
   a first alloy film being made of an alloy of iron (Fe) and platinum (Pt), or an alloy of iron (Fe), platinum (Pt) and other metal or metals; and
   a second alloy film being made of an alloy of at least two metals selected from a group including iron (Fe), nickel (Ni) and cobalt (Co),
   wherein molar content of iron (Fe) in said first alloy film is 63-74%, the saturation magnetization of said second alloy film is 2.0 T or more, and
   the coefficient of linear thermal expansion ($\Delta L/L$) of the first alloy film is approximately 0.

2. The magnetic film used for a single magnetic pole according to claim 1,
   wherein a nonmagnetic film with the thickness below 5 nm is layered on said first alloy film; and
   a second alloy film is layered on said nonmagnetic film.

3. The magnetic film used for a single magnetic pole according to claim 2,
   wherein said nonmagnetic film is made of a metallic material selected from a group including tantalum (Ta), nickel-chromium (NiCr) alloy, nickel-iron-chromium (NiFeCr) alloy, chromium (Cr), ruthenium (Ru), iridium (Ir), rhodium (Rh), rhenium (Re), alumina ($Al_2O_3$), nickel-phosphorus (NiP) alloy and titanium (Ti).

4. A magnetic head of a hard disk drive unit having a layered films, which includes the magnetic film of claim 1.

5. A solid device including the magnetic film of claim 1.

6. The magnetic film used for a single magnetic pole according to claim 1,
   wherein said second alloy film is directly layered on said first alloy film.

7. A single magnetic pole of a magnetic head comprising a magnetic film, the magnetic film comprising:
   a first alloy film being made of an alloy of iron (Fe) and palladium (Pd), or an alloy of iron (Fe), palladium (Pd) and other metal or metals; and
   a second alloy film made of an alloy of at least two metals selected from a group including iron (Fe), nickel (Ni) and cobalt (Co),
   wherein molar content of iron (Fe) in said first alloy film is 62-70%, the saturation magnetization of said second alloy film is 2.0 T or more, and
   the coefficient of linear thermal expansion ($\Delta L/L$) of the first alloy film is approximately 0.

8. The magnetic film used for a single magnetic pole according to claim 7,
   wherein a nonmagnetic film with the thickness below 5 nm is layered on said first alloy film; and
   a second alloy film is layered on said nonmagnetic film.

9. The magnetic film used for a single magnetic pole according to claim 8,
   wherein said nonmagnetic film is made of a metallic material selected from a group including tantalum (Ta), nickel-chromium (NiCr) alloy, nickel-iron-chromium (NiFeCr) alloy, chromium (Cr), ruthenium (Ru), iridium (Ir), rhodium (Rh), rhenium (Re), alumina (Al2O3), nickel-phosphorus (NiP) alloy and titanium (Ti).

10. A magnetic head of a hard disk drive unit having layered films, which includes the magnetic film of claim 7.

11. A solid device including the magnetic film of claim 7.

* * * * *

UNITED STATES PATENT AND TRADEMARK OFFICE
CERTIFICATE OF CORRECTION

PATENT NO. : 7,459,221 B2  Page 1 of 1
APPLICATION NO. : 10/997389
DATED : December 2, 2008
INVENTOR(S) : Noma

It is certified that error appears in the above-identified patent and that said Letters Patent is hereby corrected as shown below:

In the Claims:

Claim 9, Col. 8, line 58  Please delete "(A1203)" and insert -- $(Al_2O_3)$ -- in its place.

Signed and Sealed this

Nineteenth Day of May, 2009

JOHN DOLL
*Acting Director of the United States Patent and Trademark Office*